Patented Jan. 21, 1930

1,744,140

UNITED STATES PATENT OFFICE

ERNST PFEFFER, OF FRANKFORT-ON-THE-MAIN-SCHWAHNHEIM, GERMANY, ASSIGNOR TO GENERAL ANILINE WORKS, INC., OF NEW YORK, N. Y., A CORPORATION OF DELAWARE

PROCESS FOR PRINTING WITH VAT DYESTUFFS

No Drawing. Application filed January 22, 1929, Serial No. 334,363, and in Germany January 26, 1928.

The present invention relates to a process for printing with vat dyestuffs.

In my co-pending U. S. Patent application Serial No. 226,521 filed on October 15, 1927, a process is described which consists in printing the material with a vat dyestuff mixed with a solution of a cellulose ester or a cellulose ether, i..e. an organo-oxy derivative of cellulose, subsequently treating the printed material with a reducing agent and an alkali, then drying it and finally developing the dyestuff in a rapid steam-ager (Mather-Platt).

I have now found that the process of my said U. S. Patent application may considerably be simplified by passing for a short time the material after being printed through an alkaline bath to which, instead of rongalite C (formaldehyde-sulfoxylate), hydrosulfite and advantageously a wetting agent has been added. By treating the printed material with an alkaline hydrosulfite solution the cellulose ester or cellulose ether, i. e. an organo-oxy derivative of cellulose, which is insoluble in alkali and used as thickening agent, is precipitated. Any bleeding of the dyestuff is thereby prevented even if the material is further treated in a wet state. Therefore it is no longer necessary to dry the material before steaming it; furthermore steaming may be operated in a roller box, and that in a shorter time, because hydrosulfite does not require first to be split in contrast to rongalite C.

The new process is distinguished by the great economy it affords as intermediate-drying operation may be abolished and furthermore short steaming in an ordinary roller box, instead of in a rapid steam-ager (Mather-Platt) is quite sufficient and a hydrosulfite may be used instead of formaldehyde-sulfoxylate.

The following examples serve to illustrate my invention but they are not intended to limit it thereto.

The material is printed with the following printing color:

*Printing color*

200 grams of the black vat dyestuff prepared according to German Patent No. 241,997 in the form of a paste
700 grams of thickening M
100 grams of water
—————
1000 grams.

*Thickening M*

100 grams of methylcellulose are dissolved in
900 grams of cold water
—————
1000 grams.

After the material has been printed it is padded with the following solution:

100 grams of hydrosulfite concentrated powder
730 grams of water
150 ccm. of caustic soda solution of 40° Bé.
15 grams of sodium salt of the benzylsulfanilic acid
5 grams of a wetting agent
—————
1 liter.

and then immediately steaming in a roller box for half a minute. The material is then washed and soaped at the boil.

If to the alkaline hydrosulfite bath a small quantity of a vat dyestuff is added a ground-coloring operation may be carried out simultaneously with that of fixing the dyestuff on the printed material. After printing, the material is padded for instance with the following solution:

3 grams of N-dihydro-1.2-1'.2'-anthraquinone-azine
722 grams of water
150 ccm. of caustic soda solution of 40° Bé.
15 grams of the sodium salt of the benzylsulfanilic acid
5 grams of a wetting agent
100 grams of hydrosulfite concentrated powder; the whole being made up to
—————
1 liter.

Instead of methylcellulose another cellulose ester or cellulose ether, or a mixture thereof with starch or a similar thickening agent, may be used.

In the following claims the term "organo-oxy derivative of cellulose" is to be understood to comprise ethers and esters of cellulose.

I claim:

1. The process for printing with vat dyestuffs, which comprises printing the material with a vat dyestuff mixed with a solution of an organo-oxy derivative of cellulose, subsequently treating the material with an aqueous solution of hydrosulfite and an alkali, and immediately developing the dyestuff by steaming it.

2. The process for printing with vat dyestuffs, which comprises printing the material with a vat dyestuff mixed with a solution of a cellulose ether, subsequently treating the material with an aqueous solution of hydrosulfite and an alkali and immediately developing the dyestuff by steaming it.

3. The process for printing with vat dyestuffs, which comprises printing the material with a vat dyestuff mixed with an aqueous solution of a cellulose ether, subsequently treating the material with an aqueous solution of hydrosulfite and an alkali and immediately developing the dyestuff by steaming it.

4. The process for printing with vat dyestuffs, which comprises printing the material with a vat dyestuff mixed with an aqueous solution of methyl cellulose, subsequently treating the material with an aqueous solution of hydrosulfite and an alkali and immediately developing the dyestuff by steaming it.

In testimony whereof, I affix my signature.

ERNST PFEFFER.